United States Patent
Abdelnour et al.

[11] Patent Number: 6,112,241
[45] Date of Patent: Aug. 29, 2000

[54] INTEGRATED NETWORK INTERCONNECTING DEVICE AND PROBE

[75] Inventors: George Michel Abdelnour, Raleigh; John Walter Linville, Durham; Edward Stanley Suffern, Chapel Hill; Jeffrey Robert Warren, Apex, all of N.C.

[73] Assignee: International Business Machines Corporation, Armonk, N.Y.

[21] Appl. No.: 08/955,276

[22] Filed: Oct. 21, 1997

[51] Int. Cl.[7] .................................. G06F 15/173
[52] U.S. Cl. .................... 709/224; 709/217; 709/249; 370/218; 370/219; 370/220; 370/233
[58] Field of Search ............... 395/200.54, 200.47, 395/200.79; 364/550, 551.01; 709/224, 217, 249; 710/131; 370/218, 219, 220, 233, 234, 241, 244, 250, 360

[56] References Cited

U.S. PATENT DOCUMENTS

| | | | |
|---|---|---|---|
| 5,101,402 | 3/1992 | Chiu et al. | 370/17 |
| 5,231,593 | 7/1993 | Notess | 364/550 |
| 5,251,152 | 10/1993 | Notess | 364/550 |
| 5,274,631 | 12/1993 | Bhardwaj | 370/60 |
| 5,305,305 | 4/1994 | Harper et al. | 370/13 |
| 5,521,907 | 5/1996 | Ennis, Jr. et al. | 370/17 |
| 5,530,842 | 6/1996 | Abraham et al. | 395/500 |
| 5,572,674 | 11/1996 | Ernst | 395/200.1 |
| 5,586,251 | 12/1996 | Coleman et al. | 395/183.19 |
| 5,590,120 | 12/1996 | Vaishnavi et al. | 370/254 |
| 5,606,664 | 2/1997 | Brown et al. | 395/200.1 |
| 5,621,664 | 4/1997 | Phaal | 364/551.01 |
| 5,649,107 | 7/1997 | Kim et al. | 395/200.11 |
| 5,715,247 | 2/1998 | Nara et al. | 370/360 |
| 5,717,858 | 2/1998 | Shtayer et al. | 395/200.11 |
| 5,751,698 | 5/1998 | Cushman et al. | 370/252 |
| 5,764,626 | 6/1998 | VanDervort | 370/232 |
| 5,790,786 | 8/1998 | Wakeman et al. | 395/200.02 |
| 5,802,040 | 9/1998 | Park et al. | 370/232 |
| 5,838,677 | 11/1998 | Kozaki et al. | 370/389 |
| 5,867,483 | 2/1999 | Ennis, Jr. et al. | 370/252 |
| 5,887,000 | 3/1999 | Adachi et al. | 714/712 |

OTHER PUBLICATIONS

"Axon Tackles Switch Traffic Monitoring" by Claudia Graziano, Lantimes Online Apr. 24, 1995.
Market Data: IDC 1995 Worldwide Hub and LAN Switch Market Share, 3COM IDC 1995.
HP J2980A AdvanceStack 10/100 LAN Switch–16.

*Primary Examiner*—Zarni Maung
*Assistant Examiner*—Saleh Najjar
*Attorney, Agent, or Firm*—Joscelyn G. Cockburn

[57] ABSTRACT

A Local Area Network (LAN) Switch includes conventional switching functions and integrated Remote Monitoring (RMON) Universal Feature Card (UFC). The UFC allows simultaneously statistically monitoring the traffic on all ports, 100% monitoring of the traffic on one port, and monitoring the internal LAN Switch switching fabric to obtain RMON statistics about the operation of networks attached to the LAN Switch.

20 Claims, 8 Drawing Sheets

INTEGRATED NETWORK INTERCONNECTING DEVICE AND PROBE

BACKGROUND OF THE INVENTION

1. Field of the Invention

The invention relates to computer networks in general and, in particular, to devices and methods that monitor such networks.

2. Prior Art

The use of local area networks (LAN) for interconnecting computers, workstations or the like devices collectively called Data Terminal Equipment (DTE) is well known in the prior art. A typical LAN includes some type of communications media interconnecting the DTEs and protocols that, among other things, control transmission and reception of data on the LAN. The most popular types of protocols are ethernet, CSMA/CD Token Bus and Token Ring. Even though ethernet and CSMA/CD are different in minor respects, for purposes of discussion, they will be assumed to be substantially similar. The protocol for operating the LANs are promulgated by the IEEE Standard Committee for LANs. Specifically, the IEEE 802.3 Standard promulgates protocols for CSMA/CD LANs and the IEEE 802.5 Standard promulgates protocols for Token Ring and Token Bus.

Remote monitoring (hereafter called RMON) of LANs for problem isolation and determination has always been necessary to ensure proper operation of the LAN. Usually, the monitoring is done at a customer premises.

Initially, RMON devices were used to measure the physical parameters of the networks. Eventually, ISO layer 2 devices were used to capture a series of data bits, on the LAN, that were interpreted by the user. Each user had different requirements and each device had to be configured to measure the desired parameters and data pattern. To facilitate consistency in monitoring, the Remote Monitoring (RMON) standard (Request for Comments—RFC 1757) has been developed to provide a standard set of data parameters to be gathered and displayed on a network management workstation to determine network operation. For this information to be obtained, a device called a probe had to be attached physically to the network to be monitored. For single segment LANs, the probe can easily be attached to collect the RMON and display RMON information.

As LAN segments become more congested and/or more LANs are required to meet customers' requirements, interconnecting devices called LAN Switches are used. With the LAN Switch, separate LAN segments interconnecting a plurality of stations are connected to each port of the switch.

To gather the RMON statistics, the prior art uses two configurations. In one of the prior art configurations a probe is connected to each segment to collect the RMON statistics and generate RMON information that is displayed at the remote Management Workstation. In another prior art configuration, the RMON probe is at the Management Workstation and conductors connect the probe to each segment.

Still other examples of the prior art techniques and systems are set forth in U.S. Pat. Nos. 5,231,593; 5,251,152; 5,101,402 and articles entitled "*Axon Tackles Switch Traffic Monitoring*" and "*Switches Integrate Monitoring*" by Claudia Graziano, LAN Times (Online).

Even though the above prior art works well for their intended purposes, they are not effective when used in networks interconnected by interconnecting devices such as switches. In switch connected networks, multiple probes are required to monitor the segments. Adding probes to each segment is very costly and difficult to manage. Another problem is that in some of the prior art, such as U.S. Pat. No. 5,101,402, the statistics are gathered at the session level. The name "session level" suggests that the statistic gathering is done at layers above the layer 1 (physical) and layer 2 (data link) of the International Standard Organization (ISO) seven layer model. It is believed that gathering layer 1 and layer 2 (physical and data link) statistics are necessary for effective network management.

Still another problem which the prior art does not even recognize, much less address, is the gathering of RMON statistics and display RMON information about the internals of the switch. Such internal monitoring can be of immense importance in managing and distributing load in the network. The present invention provides internal monitoring of the switch.

Consequently, there is a need to provide an RMON device to collect layer 1 and layer 2 statistics. In addition, an integrated solution for gathering RMON statistics below the session level is required. The present invention described hereinafter, provides the needed solution.

SUMMARY OF THE INVENTION

It is an object of the present invention to provide an RMON device that gathers statistics more effectively than was heretofore been possible.

It is another object of the present invention to gather layer 1 and layer 2 statistics.

It is still another object of the present invention to integrate the RMON device into network interconnecting devices, such as switches.

It is still another object of the present invention to monitor the switch internally and provide internal RMON statistics.

It is yet another object of the present invention to provide statistical data at a port of the interconnecting device, whereat a management station may access the data and display RMON information.

These and other objects of the invention are achieved by a RMON system termed (RMON) Universal Feature Card (UFC), having a processor sub-system coacting with a statistical gathering subsystem that is provided with dedicated port monitoring functions that gather statistical data from any one of the device ports on a fixed time basis or gather statistical data on a time-sliced basis (roving) from all the ports. The time-sliced information gathering is termed "Roving". In addition, the internal bus or other switch fabric of the switch is monitored and statistical information on internal bus operation is provided. The remote monitoring and information gathering are done simultaneously.

In particular, the RMON system allows the user or customer to gather statistics on all ports simultaneously in a statistical manner. It also allows the customer to monitor, in real-time mode, all the traffic on one segment. With the time-slice statistical gathering of RMON statistics (called roving), the user can determine where the problem occurs. With the fixed monitoring of real-time traffic (called dedicated), the user can isolate the problem because the dedicated port gathers all the traffic on the segment in question. The RMON system also allows the user to look at the cross-port traffic internal to the LAN Switch and obtain performance data so that one knows how to segment the domains and have the most efficient segmentation of one's network. The internal monitoring also provides statistics on high speed LANs called "Uplinks" that may be connected to the switching fabric.

In one embodiment, the RMON system will be integrated into LAN Switch products as a Universal Feature Card (UFC). In addition to providing full RMON functions on one port, the RMON UFC statistically "roves" the remaining ports and gathers time-sliced statistics. These sampled RMON groups are then statistically massaged by the code in the processor or subsystem to provide "full RMON" look on all LAN Switch ports. This feature allows the user to get an overall picture of the port operation. The statistical samples are for a long enough period that lost or corrupted frames that occur while switching ports are discarded and do not significantly affect the RMON statistics.

In any given product, the user can monitor the RMON functions on all ports. When one port has a problem, the RMON UFC's program can then fully monitor the port in question while continuing to monitor the RMON statistics on the others. If the customer wants to monitor one port in full-duplex mode, the selection circuitry can be set to monitor both the transmit and receive traffic on one port only in dedicated mode. In this scenario, the roving function is not available. Since servers will usually be connected to the full duplex ports, this allows the customer to get a picture of the server traffic patterns and utilization levels.

The above and other objects, features and advantages of the invention will be better explained by the drawings that show an embodiment of the invention.

DETAILED DESCRIPTION OF THE PREFERRED EMBODIMENT

The invention to be described hereinafter is intended to be used in any type of network interconnecting devices. It works well within the type of interconnecting devices termed switches and, in particular, local area network (LAN) switches and, as such, will be described in this environment. However, this should not be construed as a limitation on the scope of the present invention since it is well within the skill of one skilled in the art to adapt the teachings of this invention to be used in other network interconnecting devices. It is the intent of the inventors that any such usage will be covered by the teachings and claims of the present invention.

Figure 1:
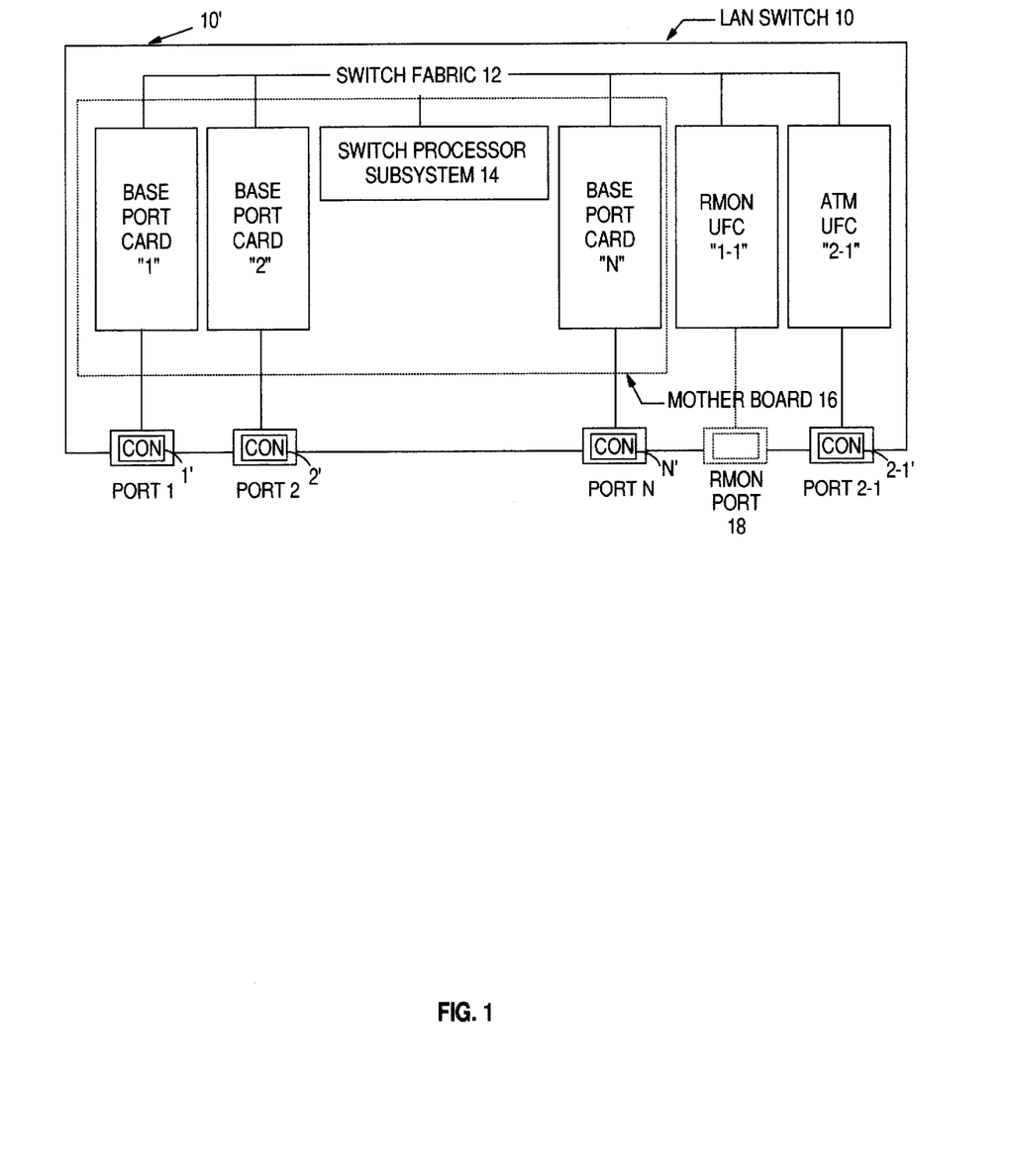
FIG. 1 shows an interconnecting device (LAN Switch) according to the teachings of the present invention.

FIG. 1 shows a block diagram of a LAN Switch 10 according to the teachings of the present invention. The LAN Switch 10 includes a Housing 10', Ports 1 through N and Port 2-1 connected to the Housing. Each port is further provided with Connector 1' through N' and Connector 2-1'. The Connectors 1' through N' are used to connect to individual devices such as a server or the like and/or LAN segments (Token Ring and/or ethernet, etc.). As will be explained in more detail below, Connector 2-1' interconnect a Universal Feature Card (UFC) to a high speed network (not shown). In the FIG. 1, the UFC is an ATM card and the high speed network would be an ATM network. Of course, another type of high speed network or feature card could be used without deviating from the teachings of the present invention.

Each Connector is coupled through Base Port Card 1 through N to the Switch Fabric 12. The Switch Fabric 12, which can be as simple as a bus, as is the case of the present invention, or more elaborate cross point switching arrangement, provides the interconnection so that the devices connected to a selected port can communicate through the switch to devices connected to another port. The Base Port Cards provide the necessary circuitry for connecting the port to the Switch Fabric 12. The management of LAN Switch 12 is provided by the block labeled Switch Processor Subsystem 14. The Switch Processor Subsystem 14 includes a processor, hereinafter referred to as the Switch Processor, and necessary electrical circuits that manages the Switch and allows communication. For purposes of discussion, only the basic components of LAN Switch 10 are shown configured on Motherboard 16. However, this should not be construed as a limitation since the arrangement of the switch need not be independent card assemble or arranged on a motherboard as shown in the figure. In other words, there are a plurality of different ways of arranging the switch and whichever way is used would fall within the purview and teachings of the present invention. In addition, it should be noted that the switch, described so far, is prior art. For example, the 8272 Token Ring LAN Switch and 8271 Ethernet LAN Switch are prior art devices which are incorporated herein for general information regarding LAN switches.

Still referring to FIG. 1, the LAN Switch 10 includes remote monitor (RMON), Universal Feature Card (UFC) "1—1" and ATM Universal Card "2-1". The ATM card is connected to the Switching Fabric and Port 2-1. The function of the ATM UFC is to provide a high speed uplink so that stations and/or LAN segments connected to LAN switches can communicate via the high speed network. It should be noted that other types of high speed networks, such as 100 Mbps Token Ring and/or 100 Mbps Ethernet feature card could be inserted instead of the ATM. As discussed above, the presence of a Universal Feature Card for high speed communications is part of the prior art and further discussion will not be given.

Still referring to FIG. 1, the RMON UFC "1—1" provides remote monitoring in LAN Switch 10. The integration of the remote monitor, also called a probe, to the best of applicants' knowledge, has never been done, before, in the switch. By integrating the probe (RMON UFC) in the switch, several benefits and functions described below are provided which were not available in prior art switches. Optionally, the RMON UFC can be connected to a RMON Port 18 with a connector. Because the port is optional, it is shown in broken lines. This RMON port can be used for communicating directly with the RMON UFC for monitoring information in the RMON UFC. It should be noted that without the port, communication with the RMON can be effectuated through any of the other connector ports on the switch.

Figure 3:
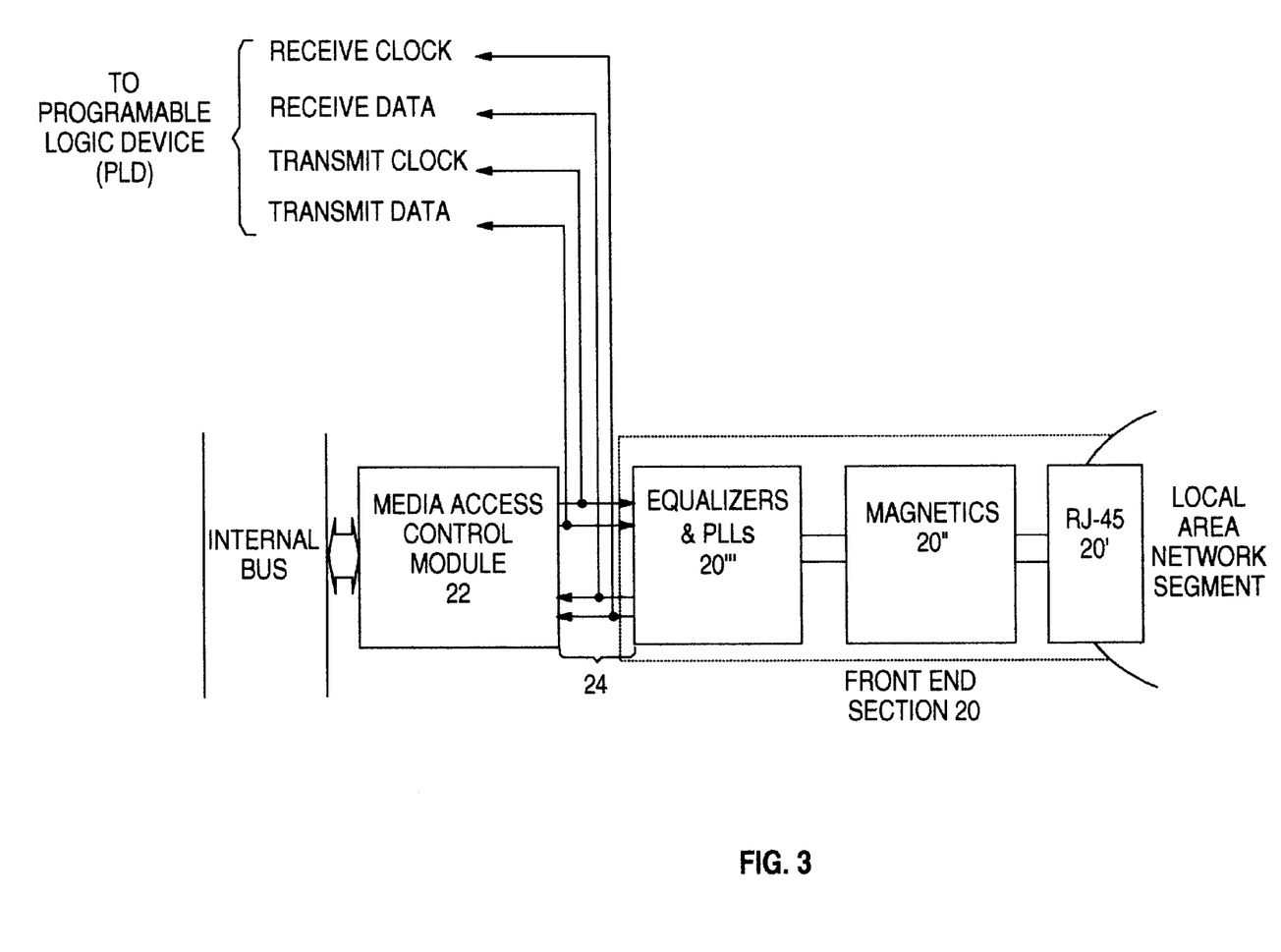
FIG. 3 shows a block diagram of a port card interconnecting a switch port to the switch bus and signal taps that provides signals used in the present invention.

FIG. 3 shows a block diagram for the base port card or the high speed port card which connects a port to the Internal Bus. The port card basically includes a Front End Section 20 and a Media Access Control Module 22. The Front End Section 20 enables data and clock signal to be received from a LAN segment and/or transmitted on the LAN segment. The Front End Section 20 includes a Connector 20', Magnetics 20" and Equalizers and Phase Lock Loops (PLLs) 20'". The function of these elements are well known in the prior art; therefore, detailed descriptions of these will not be given. Suffice it to say that Connector 20' could be any of the well known off-the-shelf connectors such as an RJ-45 connector or similar devices. This connector is able to tap into the LAN segment and receive and/or transmit information in the form of electrical signals. Likewise, Magnetics 20" includes transformers which enable the transmission of signals bi-directionally. The Equalizers and Phase Lock Loops include circuit which equalizes a signal and extracts clock signals and data signals from incoming information. For outgoing data, the Equalizers equalize the signal for transmission. The Data and Clock Signals that are transmitted and/or received can be broadly classified as Receive Clock and Data for incoming clock and data information and Transmit Clock and Data for outgoing clock and data information. The Media Access Control Module 22 includes a protocol handler and other devices that process data signals in accordance with the predetermined protocol. For incoming data signals, the information part of the frame is forwarded to the internal bus. For transmit data, the information part of the frame is delivered to the Media Access Control Module 22 that adds protocol information and forwards the frame to the Front End Section 20.

The RMON UFC Connector 24 taps incoming and outgoing signals and forwards to the RMON UFC for further processing. The signals which are tapped include Receive Clock, Receive Data, Transmit Clock and Transmit Data.

Figure 2:
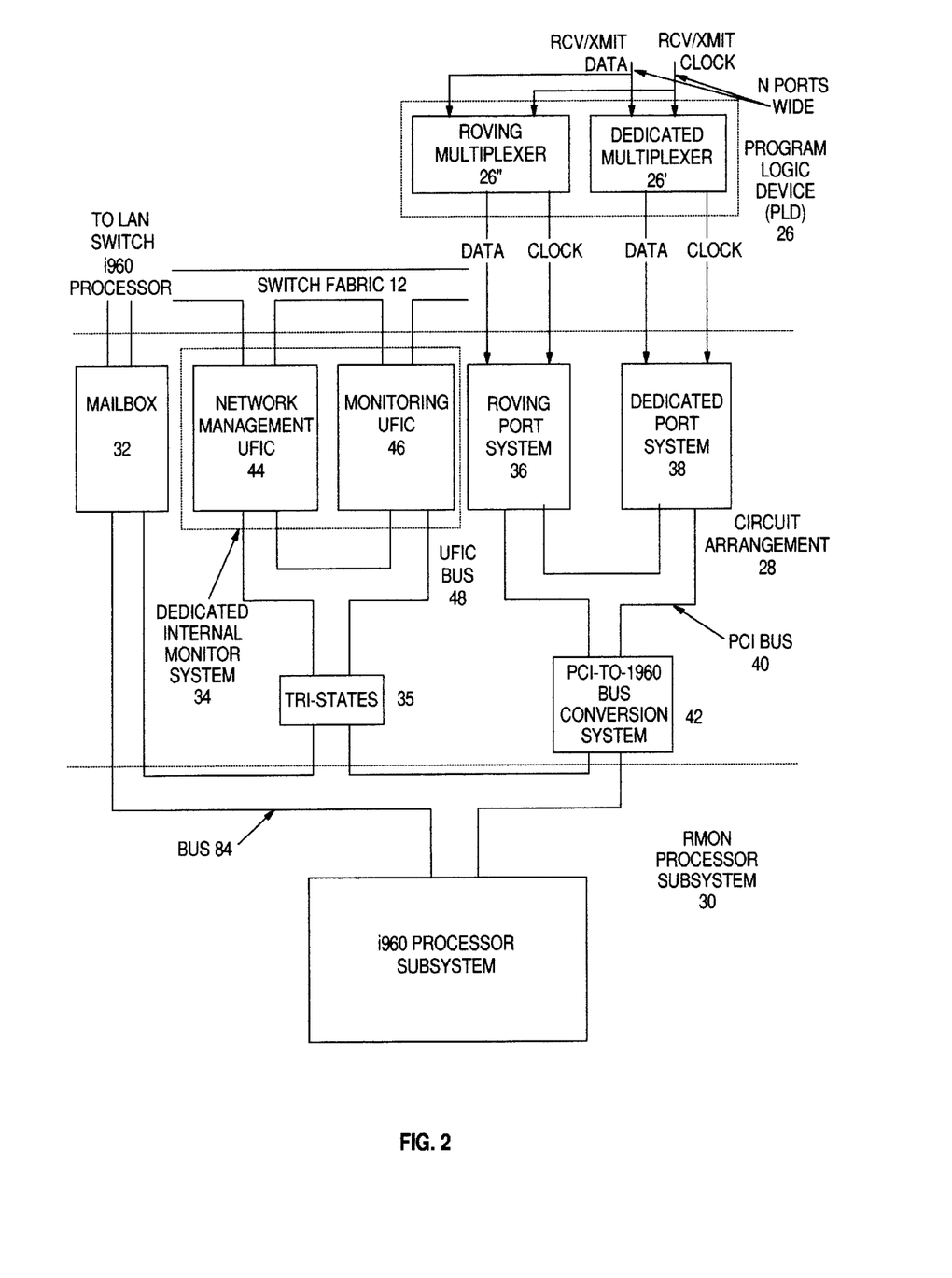
FIG. 2 shows a block diagram of the RMON UFC according to the teachings of the present invention.

FIG. 2 shows a block diagram of the RMON UFC, known also as Probe, according to the teachings of the present invention. It should be noted that RMON UFC and Probe are used interchangeably to represent the same device in the present invention. The RMON UFC includes RMON UFC Connector 24 (FIG. 3), Programmable Logic Device (PLD) 26, Circuit Arrangement 28 and RMON Processor Subsystem 30. The RMON Connector 24 (FIG. 3) collects signals from the receive/transmit (XMIT) clock lines and receive/transmit (XMIT) data lines. The RMON Connector can be as elaborate as one chooses or simple taps as is shown in FIG. 3. The Programmable Logic Device 26 monitors the receive/transmit data and receive/transmit clock lines from all switch ports and selects one for future processing. The Circuit Arrangement 28 includes the hardware for gathering of data from the port interface and the switch fabric interface. The RMON Processor Subsystem 30 includes the software which process the gathered information to generate RMON statistics and other information which is used for managing the network. In the preferred embodiment of this invention, a i960 microprocessor fabricated by the Intel® Corporation is used. For purposes of discussion, it is also assumed that the main LAN Switch Processor is also an i960 processor. The bus of both processors are coupled via the Mailbox 32. The function of the Mailbox 32 is to enable the interchange of information between the LAN Switch Processor and the RMON Processor. It should be noted that any other processor, other than the i960, can be used without deviating from the scope or spirit of the present invention.

Figure 4:
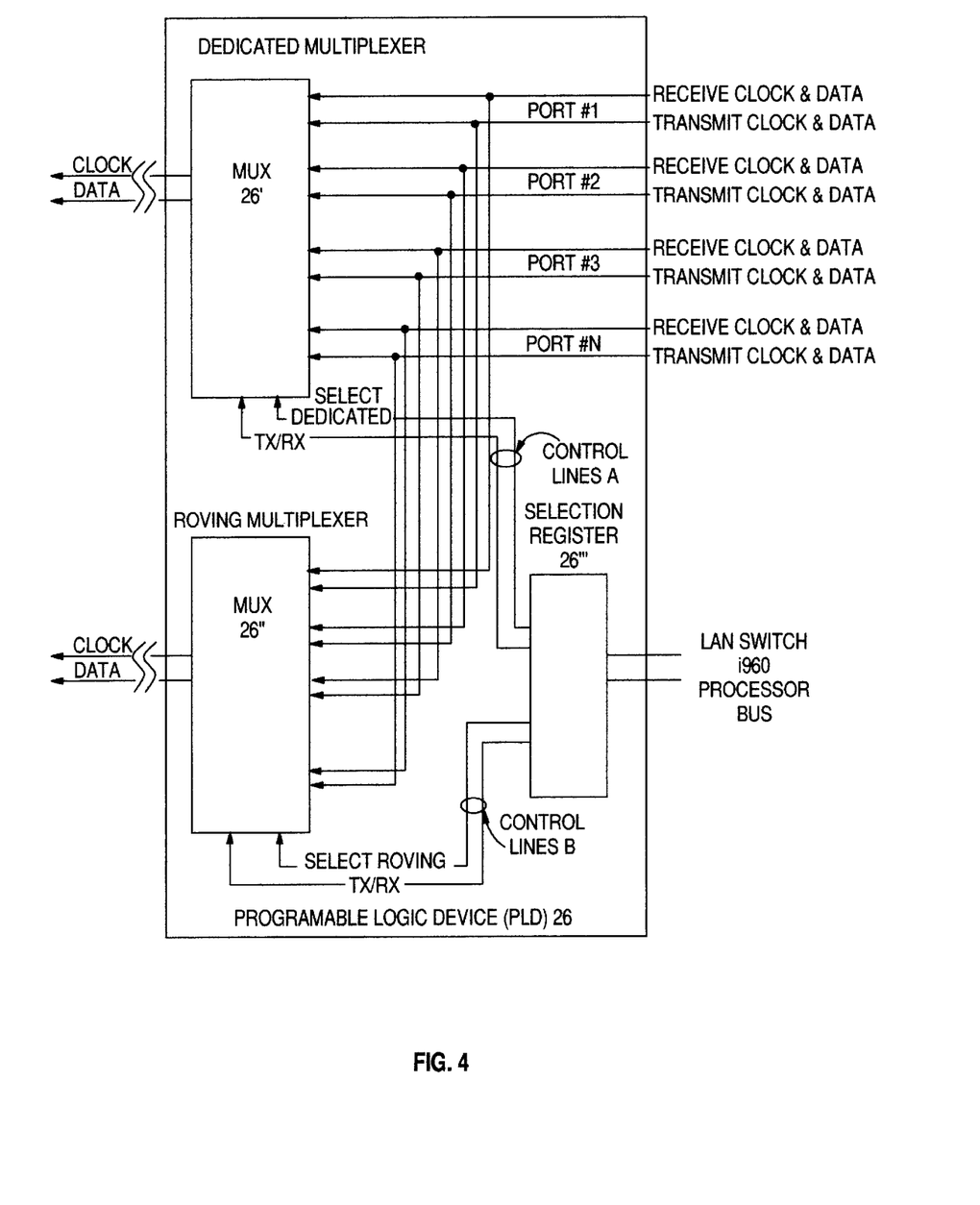
FIG. 4 shows a Programmable Logic Device (PLD) that selects ports to be monitored on a fixed bases or time shared basis (roving) according to the teachings of the present invention.

Referring to FIGS. 2 and 4, the PLD 26 includes Dedicated Multiplexer (MUX) 26', Roving Multiplexer (MUX) 26" and Selection Register 26'". The Selection Register 26' is connected over the LAN Switch i960 Processor Bus to the Switch Processor. Based upon commands outputted from the Switch Processor, either the MUX 26' is selected over Control Lines A or Roving Multiplexer 26" is selected via Control Lines B. Each of the ports in the switch has clock lines (transmit/receive) and data lines (transmit/receive) interconnecting the port and the Multiplexers (MUX 26' and MUX 26"). Thus, Port #1 has Receive Clock and Data and Transmit Clock and Data. Likewise, Port #2 includes Receive Clock and Data and Transmit Clock and Data and so forth. Depending on the setting of Control Line A or Control Line B, clock and data is selected from one of the ports through the Dedicated Multiplexer (MUX 26') and/or through the Roving Multiplexer.

It should be noted that signals, hereinafter called traffic, can be monitored on both Half-Duplex Ports and Full-Duplex. The monitoring is as follows:

Half Duplex:

In RX-mode: All traffic and a port, say Port X, is monitored. This means traffic from Port X addressed to hosts on other segments and hosts on the segment. Also, all traffic to Port X from other hosts or segments is monitored.

In TX-mode: This mode is not available since all traffic is monitored.

Full Duplex:

In RX-mode: All traffic from Port X addressed to other ports and the other segments are monitored.

In TX-mode: All traffic to Port X from host to other segments are monitored.

In addition to either full or half duplex ports, the user may elect to monitor a port in the DEDICATED mode or ROVING mode. With reference again to FIG. 2 and FIG. 4, in the Dedicated mode, the Dedicated Multiplexer 26' selects the designated port. Likewise, if the roving mode is selected, the Roving Multiplexer elects the port to be monitored. As is used in this document, dedicated mode means that the user obtains all the traffic from a selected port and the RMON statistics are 100% accurate. Roving mode means that the gathering of RMON statistics are done in a time slice manner. Statistics are gathered for a certain time on one port, the monitored port is changed and statistics are gathered on the new port for a certain period. The program and hardware statistically rove all the ports on the LAN switch to gather enough information to provide RMON statistics. The gathered statistics are then adjusted to compensate for the time slice mode of gathering information. The adjustment, for example, increases a port's statistics by eight if eight ports are currently being roved in an equal time slice. If traffic load on a port is high (relative to other monitored ports), the roving logic may spend more time gathering statistics on this port and, therefore, the adjustment would not have an equal uplift as the other lightly loaded ports.

Still referring to FIG. 2, the Circuit Arrangement 28 includes Mailbox 32, that interconnects the i960 Processor Bus of the LAN switch with the i960 Processor Bus of the RMON UFC. Commands are passed between the LAN Switch i960 Processor and the RMON UFC i960 Processor through the Mailbox 32. Appendix B sets forth a list of commands used between the processors. Other commands can be used without deviating from the present invention. The Dedicated Internal Monitor 34 (including Network Management and Monitoring) is connected to Switch Fabric 12, over appropriate busses and through appropriate busses and Tri-state Circuitry 35 to the i960 Processor Bus. The Dedicated Internal Monitor System 34 (details given below) provides an internal interface for monitoring traffic across the Switch Fabric 12. This function provides RMON 1 and RMON 2 statistics for the switch fabric and port within the LAN switch. Among other things, the dedicated internal monitor provides RMON function for high speed LAN switch (uplinks) for which no RMON information could previously be gathered. With respect to FIG. 1, the information gathered would be relative to the ATM high speed uplink.

Still referring to FIG. 2, the Roving Clock and Data Information signals provided by Program Logic Device 26 is processed by Roving Port System 36. Likewise, the Dedicated Clock and Data Information signals provided by the Program Logic Device 26 is processed by Dedicated Port System 38. A bus structure, termed PCI BUS 40, in accordance with the PCI format couples the output of Roving Port System 36 and Dedicated Port System 38 to Bus Conversion System 42 which converts signals on the PCI Bus 40 to match signals on the i960 Processor Subsystem. Additional details of the Circuit Arrangement 28 will be given hereinafter. It should be noted that the i960 Processor Subsystem processes signals gathered by the previously described circuit to generate RMON statistics.

Figure 5:
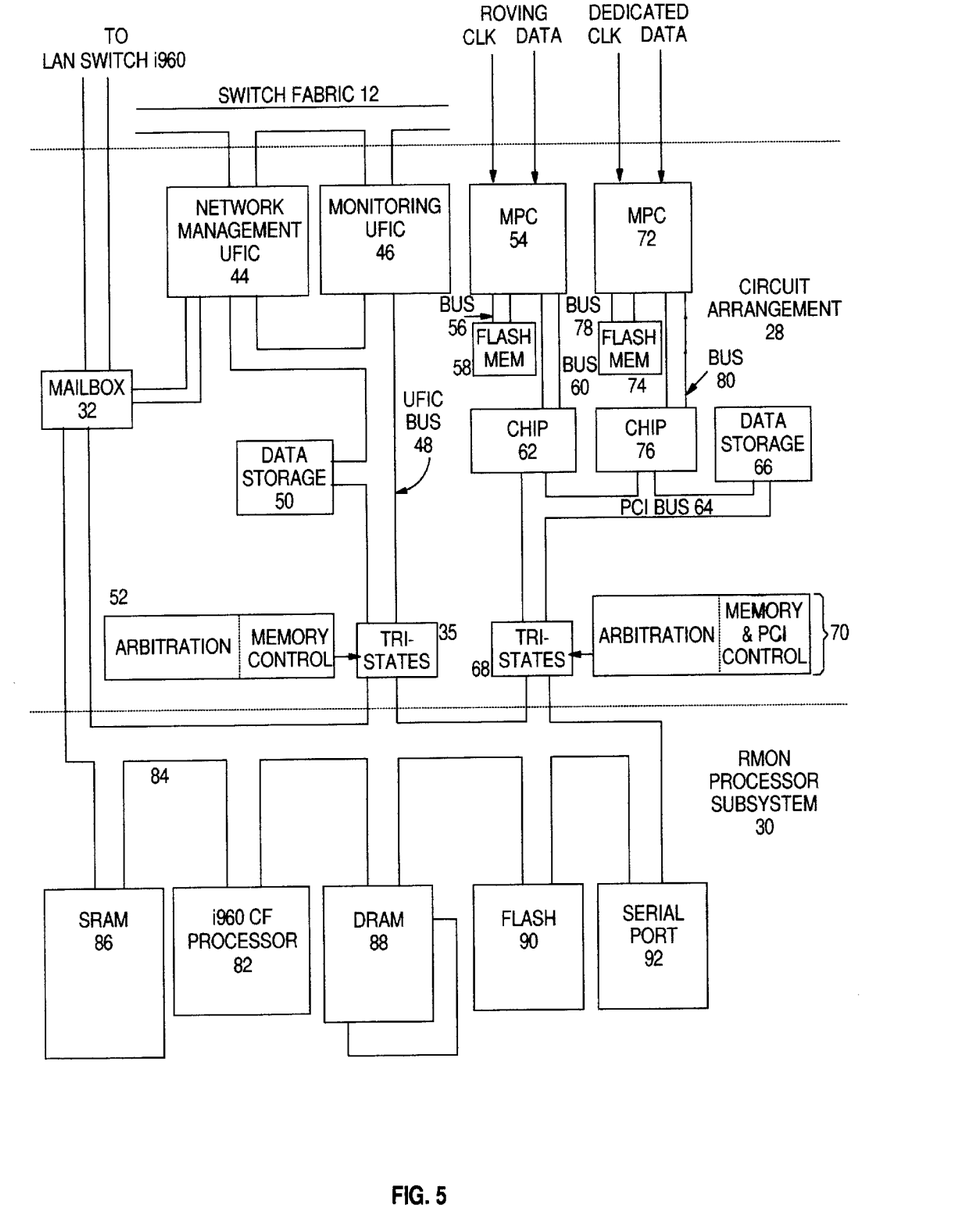
FIG. 5 shows a more detailed block diagram of the present invention according to the teachings of the present invention.

Referring now to FIGS. 2 and 5 (wherein FIG. 5 shows a more detailed block diagram of Circuit Arrangement 28 and RMON Processor Subsystem 30) the Dedicated Internal Monitor 34 includes Network Management Universal Feature Interface Chip (UFIC) 44 and Monitoring UFIC 46. The UFICs 44 and 46 are connected by a UFIC Bus 48 to Data Storage 50 and Tri-state Circuit 35. The Tri-state Circuit 35 isolates the UFIC Bus 48 from the i960 CF Processor Bus 84. Access to use the Bus 84 or Data Storage 50 is provided by the Arbitration/Memory Control Logic Circuitry 52. In the preferred embodiment of this invention, the Data Storage 50 is an SRAM storage with approximately 512 Kbytes. Also, the Mailbox 32 connected to UFIC 44 and the i960 CF Processor is a two port random access memory device (RAM).

Still referring to FIG. 5, the Network Management UFIC 44 is used for monitoring normal communications to/from the RMON UFC and the network management workstation containing the RMON display application and connected to one of the switch ports or somewhere else in the network. With respect to the Network Management UFIC 44, initially the location of the Management Station is not known. As a message enters the LAN switch for the first time, it is broadcast to all outputs on the switch fabric. In the case of the RMON UFC, this message is received by the Network Management UFIC 44 and placed in Data Storage 50. An interrupt sent to i960 CF Processor then fetches this message, processes it and formats a response. The response is placed in Memory 50 and the UFIC automatically appends switch fabric routing information so the message is sent to the appropriate port containing the network management station. Once a connection between the RMON UFC and the network management station is established, communication is direct unicast traffic without using the broadcast messaging capability of the switch.

Still referring to FIG. 5, the Monitoring UFIC 46 is useful to monitor switch fabric traffic into or out of one of the "FAT-PIPE" (high speed link) UFCs, such as the ATM UFC 2-1 FIG. 1). To perform this function, the Monitoring UFIC 46 (to be described subsequently in greater detail) contains a monitor register set by a LAN switch program (to be discussed later) executing on the i960 LAN Switch Processor. First, the LAN Switch Processor sends a table of all the switch interfaces to the RMON UFC at the end of the initialization process. The user then decides which interface to monitor and sends this request to the RMON UFC. Upon command of the RMON UFC, the LAN Switch i960 processor sends a message to the Monitor UFIC 46 to monitor traffic on the switch fabric from a specific high speed port. The Monitor UFIC 46 then "listens" on the switch fabric for messages with addresses matching that of the specific high speed port. When a match is found, the message is copied from the switch fabric into the Data Storage 50 and sent to the RMON UFC processor for processing.

Figure 6:
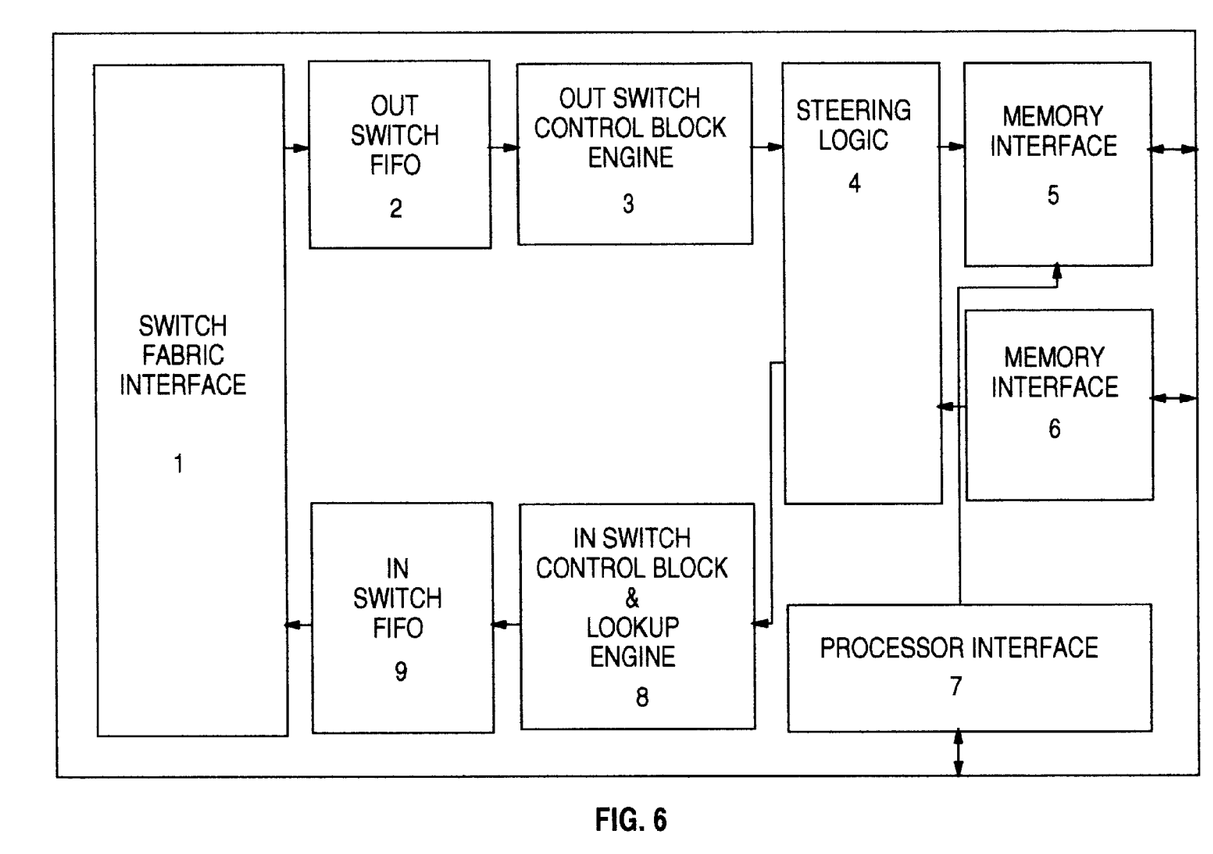
FIG. 6 shows a block diagram of the Universal Feature Interface Chip (UFIC) according to the teachings of the present invention.

Referring now to FIG. 6, a block diagram for each of the UFIC is shown. The UFIC includes Switch Fabric Interface 1, Out Switch FIFO 2, Out Switch Control Block Engine 3, Steering Logic 4, Memory Interface 5, Memory Interface 6, Processor Interface 7, In Switch Control Block and LookUp Engine 8 and In Switch FIFO 9. The named elements are interconnected as shown in FIG. 6.

Still referring to FIG. 6, packets coming from the Switch are stored in the Out Switch FIFO 2. The Out Switch FIFO is memory internal to the UFIC chip. Block 3, the Out Switch Control Block Engine, selects buffer descriptors and reserves buffers in the RMON shared memory. The Steering Logic 4 then moves the packets out to the RMON card. The data is transferred to the RMON shared memory through the Memory Interface Logic 5 or 6. The reverse path works exactly the same way, with data stored in the In Switch FIFO 9 before being sent out to the Switch. The Processor Interface logic is used to configure the memory interface and set up the UFIC internal registers.

It can be seen from the above discussion that the UFIC is configured to operate using a single memory interface for transmit and receive directions and to store the control information for the buffer management scheme. The UFIC has a 32-bit memory interface which is tri-stated and isolated from the main i960 Processor Bus. The LAN Switch i960 processor is responsible for initializing the control blocks for the buffer memory. When an entire frame has been stored in the buffer, an interrupt is sent to the i960 CF Processor. The Processor then services this buffer and releases the storage once the data has been processed. Since the processor has few other tasks to perform, the control blocks are polled to determine when subsequent buffers are full.

Still referring to FIGS. 2 and 5, the Roving Port System 36 gathers data in a time slice manner from the ports. The Roving Port System 36 includes a Multiprotocol Chip (MPC) 54 connected by Bus 56 to Flash Memory 58 and by Bus 60 to Chip 62. The MPC 54 is a MAC controller which handles both ethernet and Token Ring protocols. An off-the-shelf chip which could be used is the MPC module part number 38H6302, manufactured and sold by the IBM Corporation. It should be noted that any chip which performs a protocol consistent with the protocol that is transported on the network could be used instead of MPC 54. Therefore, using MPC 54 is not intended to limit the invention in any way. Likewise, Bus 60 is a 4-byte bus and the Chip 62 enables the passing of data to a PCI Bus 64 which is connected to Data Storage 66. In the preferred embodiment of this invention, the data storage 66 is an SRAM having approximately 512 Kbytes. The Chip 62 can be any circuit arrangement which can be used to adapt four byte Bus 60 to the PCI Bus 64. In the preferred embodiment of this invention, an off-the-shelf chip called "Hermon", part number 38H5818, manufactured and sold by the IBM Corporation, is used. It should be noted that similar chips performing the named function can also be used without deviating from the spirit or scope of the present invention. The PCI Bus 64 is isolated by Tri-state Circuit 68 from the i960 CF Processor Bus. Access to the Data Storage 66 is provided by Arbitration/Memory & PCI Control Logic 70.

Still referring to FIGS. 5 and 2, the Dedicate Port System 38 includes MPC 72, Memory 74 and Chip 76. Bus 78 interconnects MPC 72 to Flash Memory 74 and the Bus 80 interconnects MPC 72 to chip 76. The function and structure of the items described in the Dedicated Port System 38 are identical to those described relative to Roving Port System 36. Therefore, further description of the component and interconnection of the Dedicated Port System 38 will not be given. Suffice it to say that the component in the Roving Port System 36 provides information on each port on the time slice basis while the components in the Dedicated Port System 38 perform information on a fixed time basis.

Still referring to FIG. 5, the RMON Processor Subsystem 30 includes an i960 CF Processor 82 coupled by Bus 84 to SRAM 86, DRAM Memory 88, Flash Memory 90 and Serial Port 92. In the preferred embodiment of this invention, SRAM 86 stores instructions and is approximately 512 Kbytes. The i960 CF Processor includes a 4K I-cache, 1K D-cache, 33 MHz and Hx-ready function. The DRAM 88 includes 32 Megabytes, 16 Meg populated, 16 Meg Expansion all on-card. The flash memory is approximately 1 Meg. It should be noted that these values are merely used for purposes of description only and other values can be used without deviating from the spirit or scope of the present invention. As stated above, the overall functions of the processor subsystem is to analyze the RMON statistics that are collected via the Circuit Arrangement 28 and PLD26 (FIG. 2). The Serial Port 92 is used for configuration, diagnostic information and limited RMON Management Information Base (MIB) support in case the internal LAN switch connection to the network management station is not operational. With reference to FIG. 1, the Serial Port 92 would overlay the RMON Port 18.

Still referring to FIG. 5, the Intel i960 CF Processor running at 33 Mhz executes instruction from SRAM 86 running at the processor speed. There are no wait states while the program is executing. Flash Memory 90 contains the initial program and a bootstrap initialization program transfers the program in flash memory to the SRAM for execution. The processor subsystem is verified prior to enabling the execution of the main program. The capability of the RMON Processor Subsystem 30 for analyzing collected data and providing the RMON statistics is a key criteria in the design. Most of the data collected arrives at a slow, low rate but requires fast processing since two small frames of data can be received back to back. Consequently, the microcode operating system and code path lengths are critical for analyzing the data quickly. It is believed that a processor subsystem including the components recited above are adequate for making the calculations. According to current calculations, the i960 CF Processor can process up to 32,000 packets per second. If one performs the calculation, 32,064-byte package equates to about 20 megabits per second. This traffic rate is acceptable on the average, but may be too low for peak rate conditions. In the event this data rate is not sufficient, higher performance processors, such as the Intel H-series can be used to replace Processor 82.

Figure 7:
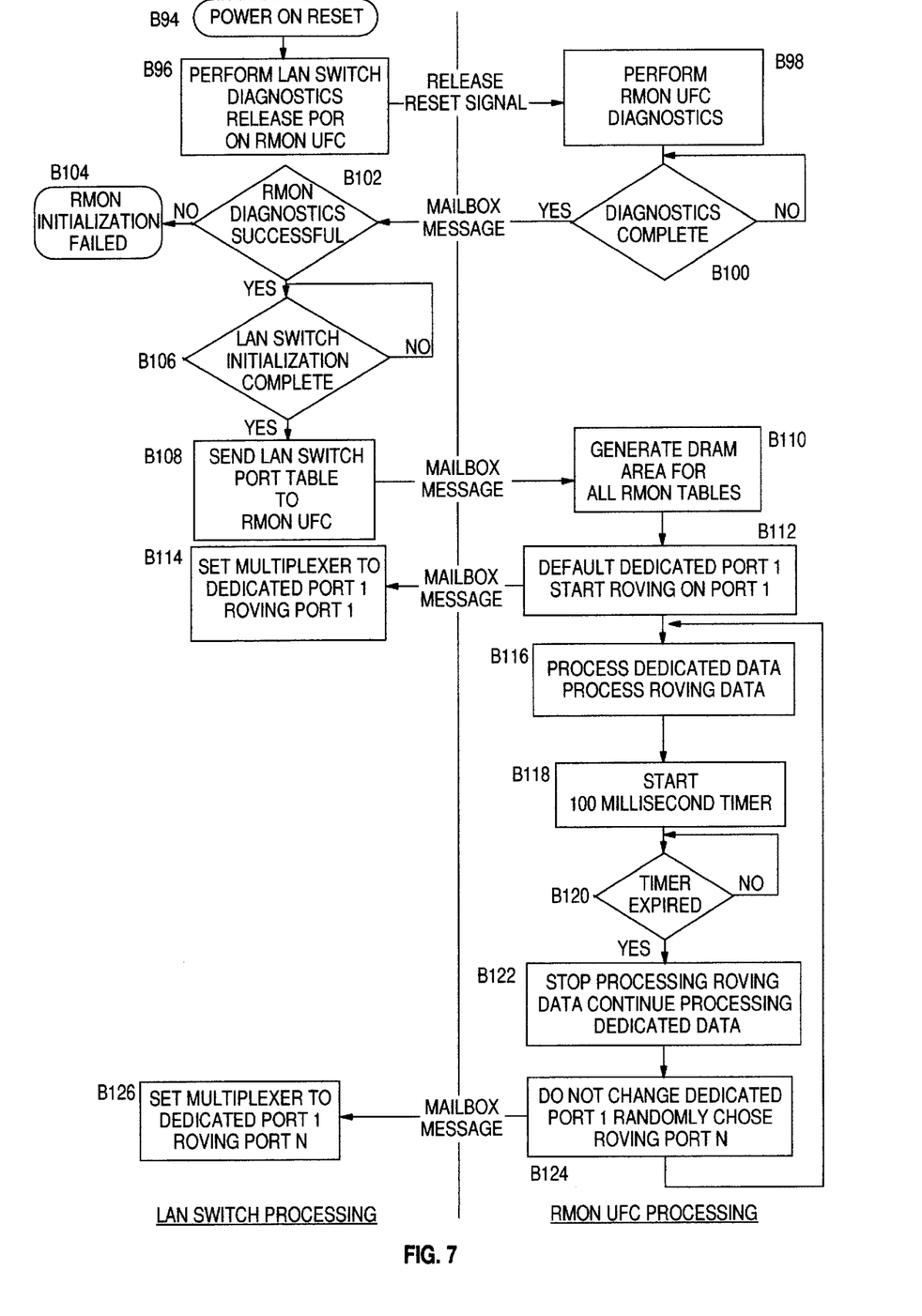
FIG. 7 shows a flowchart for processing on the LAN Switch Processor and RMON UFC Processor, according to the teachings of the present invention.

FIG. 7 shows a flowchart of the processing that occurs by the LAN Switch Processor and that which occurs on the RMON UFC Processor. The LAN Switch Processing is shown on the left hand side of the vertical line and the RMON UFC processing is shown in the right hand side of the vertical line. The vertical line basically represents the Mailbox 32 (FIGS. 2 and 5) and the respective messages which are transmitted between the LAN Switch Processor and RMON Processor are shown.

In FIG. 7, the Power On Reset functions are performed in Block 94, and the process descends into Block 96 where the LAN switch executes its diagnostic program and issues release Power On Reset Signals to the RMON UFC which runs its own diagnostics in Block 98. From Block 98, the program on the RMON UFC processor descends into Block 100 where the diagnostics for the RMON Processor is executed and loops until it is completed and mailbox messages are issued via Mailbox 32, FIGS. 2 and 5.

The program in the LAN Switch Processor then enters Block 102 where it tests to see if the RMON diagnostic was successfully executed. If it was not successful, the program enters Block 104 where a flag or other indicia is set, indicating that the initialization has failed. If the initialization is successful, the program descends into Block 106 where it tests if the LAN switch initialization is complete. If it is not, the program loops and when it is completed, the program descends into Block 108. In Block 108, the LAN switch program sends the LAN switch port tables to the RMON UFC via mailbox messages.

The process then enters Block 110 where the RMON program generates storage area in the DRAM for the RMON tables. The program then descends into Block 112 where dedicated statistics gathering for Port 1 is defaulted and the program starts roving on Port 1 using the Programmable Logic Device 26 and associated roving port system discussed above. The program then places related messages in the mailbox and enters Block 114 in the LAN Switch Processor. In Block 114, the LAN Switch Processor selects Port 1 as the dedicated port to obtain statistics.

Figure 8:
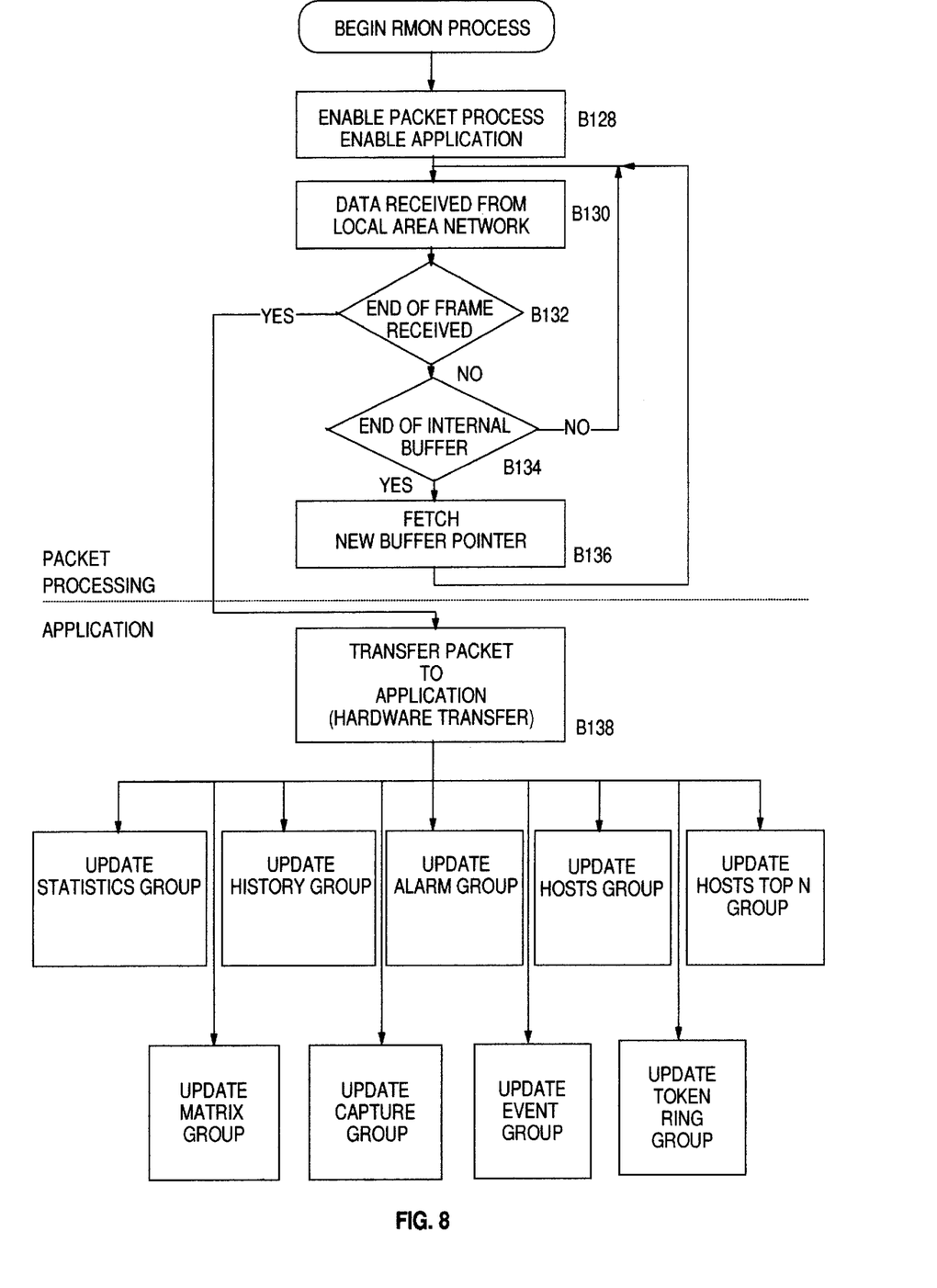
FIG. 8 shows a flowchart of programs to be executed on the packet processor (i960 CF Processor) according to the teachings of the present invention.

Still referring to FIG. 7, and in particular Block 112, the program also descends into Block 116 where data associated with a dedicated port and data associated with a roving port are collected. The program then descends into Block 118 where a 100 millisecond timer is started. The time represents the period for which data is monitored on a port, using the roving function of the invention. The program on the RMON Processor then descends into Block 120 where it tests to see if the time set in Block 118 has expired. If it has not, the program loops until it is expired and descends into Block 122 where the RMON Processor stops processing roving data while processing of the dedicated data is continued. The program then descends into Block 124 where processing on the Dedicated Port 1 still continues while the program selects the randomly roving Port N. Any messages from Block 124 are stored in the mailbox and are sent to the LAN switch program Block 126, where the program is set to Dedicated Port 1 and Roving Port N. In FIGS. 7 and 8, B, preceding all numerals, is the abbreviation for Block.

FIG. 8 shows a flowchart for processing that occurs by the RMON UFC, from reception of packet from the port to updating the RMON tables. This flowchart explains what goes on in Block 116 of FIG. 7. Once Power-On Reset is released and the LAN Switch is initialized, the switch informs the RMON card to start processing data. The RMON starts by enabling the packet processing interfaces and starts its application (B128). Packets from the selected port are received in Block B130. The MPC card (FIG. 5) receives the packets as described above. Data is sent to the local SRAM memory 50 (FIG. 5) and stored in buffers. If the packet is longer than the 256-byte long Buffer B134, then the PCI Interface Module (FIG. 5, Chip 62 or 76) fetches another buffer descriptor and continues storing data in it B136 until the MPC card receives an End of Frame indication (B134). This process is executed simultaneously for dedicated and roving traffic.

Following the flowchart, we now enter Block B138 where the full packet is transferred under hardware control to the i960 Microprocessor Memory. The i960 Microprocessor then uses software to update the 9 RMON groups shown in FIG. 8 and described in Appendix A.

The RMON UFC according to the teachings of the present invention provides a Remote Network Monitoring, MIB consistent with RFC 1757 Standard, incorporated herein by reference. A set of RFC 1757 Statistical Groups provided by the invention is set forth in Table 2 of Appendix A.

Because there are contentions for the RMON i960 Processor and Memory, the base RMON i960 Card contains a arbitration mechanism to ensure that all tasks can be executed in the most efficient manner possible. To this end, there is a priority scheme established for the interfaces. The UFIC Monitoring Interface has the highest priority and always gets service. The Dedicated and Roving Port interfaces operate at a much slower speed and have second priority. These two are serviced equally in this priority level. If one port is being serviced and both ports have an interrupt raised, the arbitration mechanism services the one not currently being serviced to ensure fairness. The lowest priority is the network management interface UFIC. This interface is not time constrained like the other three. The following Table 1 illustrates the priority of the different interfaces, preferably implemented on a daughter card.

TABLE 1

| TASK | PRIORITY OF SERVICE |
| --- | --- |
| RMON i960 Processor | 1 |
| UFIC Monitor traffic | 2 |
| UFIC Network Management Traffic<br>Dedicated port message complete<br>Roving port message complete | 3 |

An overall description of the RMON UFC will now be given. Data signals (Roving and/or Fixed) received from the external ports are sent to the PLD 26 (FIGS. 2 and 4) that perform the selection process. The appropriate signal is selected by base i960 program executed in the i960 switch processor by writing a register on the LAN i960 Processor Bus FIG. 4. The selected Local Area Network clock and data signals are then sent to the appropriate MPC card (FIG. 5) for further processing. The signals enter the MPC module, and the MPC module converts the serial data into parallel form. The MPC operates in transparent mode so that it transfers all the data it receives. This transfer is done through the appropriate Chip 62 or 76 which adapts the MPC module interface to the PCI interface. The Chip 62 or 76 also adapts the 2-byte wide MPC data bus to the 4-byte wide PCI bus, and an elastic buffer in the Chip 62 and 76 ensures that the data transfer continues without interruption. In the preferred embodiment of this invention, as is stated above, the Chip 62 and 76 is the Hermon chip. Data then exits the Hermon chip and is sent to the local SRAM memory under control of the PCI Control Logic Circuit Arrangement 70. Data is stored in buffers and when the loading of the frame is complete, the RMON UFCs i960 Processor is interrupted so it can process the data. One process occurs for the dedicated traffic and another process occurs simultaneously for the roving process.

In addition to the single port roving and dedicated RMON function, the RMON UFC is capable of providing RMON function for traffic on the internal LAN Switch. To provide this function, the Monitoring UFIC 46 is configured in the monitor mode. The configuration is done by the LAN Switch i960 Processor to monitor data traffic from a specific port. In this mode, the UFIC receives data from the internal LAN switch bus, it stores this data in Data Storage 50. The LAN Switch i960 processor is responsible for initializing the control blocks for storing the data. Once an entire frame has been stored, the UFIC chip interrupts the RMON i960 processor and it services the frame. When the servicing is completed, the RMON i960 Processor 82 releases these buffers as free buffers in the buffer descriptor list. Each time a frame has been received in the memory, the RMON i960 processor is interrupted. The interrupt microcode must contain a tight timing loop since it could receive multiple interrupts for the small frames at 160 Mbps. For a 64-byte message, the RMON i960 has approximately 7 microseconds to process the interrupt before the next one arrives.

The Network Management UFIC 44 (FIGS. 2 and 5) provides network management interface to the switch fabric. The Network Management UFIC 44 is configured to look for its port of exit (POE) on messages addressed on it. The message is then transferred into the network management queue for processing by the i960 CF processor. This task is a relatively low priority task since it does not directly have to do with the processing of received data at high data rates. Once the RMON's i960 has processed the message, it formats the response in its entirety by appending both the tag field and the POE. The UFIC transfers the response transparently to the internal LAN Switch bus.

The following benefits are provided by the RMON UFC of the present invention:

The RMON UFC is able to provide all RMON groups. The RMON UFC is also integrated in the LAN Switch eliminating the need for multiple physically separate probes to be attached to a central workstation.

The RMON UFC provides statistically accurate RMON groups on all LAN Switch interfaces. When a problem is found, the user can then turn his attention to the questionable interface by dedicating the gathering of RMON statistics to one interface while continuing to simultaneously monitor all LAN Switch interfaces. Dedicating the collecting of RMON groups allows the customer to investigate and solve the problem.

The user also obtains a picture of the activity inside the switch with the RMON UFC's internal monitoring of traffic on the switch fabric. With this function, the user can see segment-to-segment problems and re-route or rearrange his traffic patterns inside the LAN Switch.

Both RMON 1 data link layer and RMON 2 routing layer statistics are provided by the RMON UFC. An RFC 1757 compliant set of MIBs allow different applications to obtain and analyze the information provided. As a consequence, a network management application could integrate the LAN Switch RMON MIBs into a common structure across the customer's entire network, allowing one to easily analyze and correct network problems.

In the foregoing, the invention has been described with reference to specific embodiments thereof. However, it will be evident that various modifications and changes may be made thereto without departing from the broadest spirit and scope of the present invention as set forth in the appended claims. Consequently, the specification and drawings are to be regarded in an illustrative rather than a restrictive way.

TABLE 2

APPENDIX A
RMON MIB Support - MAC Layer

| MAC-Layer Statistics Group | MAC-Layer History Group |
|---|---|
| Drop Events | Drop Events |
| MacOctets | MacOclets |
| MacPkts | MacPkts |
| RingPurgeEvents[1] | RingPurgeEvents[1] |
| RingPurgePkts | RingPurgePkts |
| BeaconEvents[1] | BeaconEvents[1] |
| BeaconTime[1] | BeaconTime[1] |
| BeaconPkts | BeaconPkts |
| ClaimTokenEvents[1] | ClaimTokenEvents[1] |
| ClaimTokenPkts | ClaimTokenPkts |
| NAUNChanges | NAUNChanges |
| LineErrors | LineErrors |
| InternalErrors | InternalErrors |
| BurstErrors | BurstErrors |
| ACErrors | ACErrors |
| AbortErrors | AbortErrors |
| LostFrameErrors | LostFrameErrors |
| CongestionErrors | CongestionErrors |
| FrameCopiedErrors | FrameCopiedErrors |
| FrequencyErrors | FrequencyErrors |
| TokenErrors | TokenErrors |
| SoftErrorReports | SortErrorReports |
| | RingPollEvents[1] |
| | ActiveStations[1] |

Note:
[1] Entry not supported on roving interfaces

TABLE 3

RMON MIB Support - Promiscuous

| Promiscous Statistics Group | Promiscous History Group |
|---|---|
| Drop Events | |
| DataOctets | DataOctets |
| DataPkts | DataPkts |
| DataBroadcastPkts | DataBroadcastPkts |
| DataMulticastPkts | DataMulticastPkts |
| DataPkts18to83Octets | DataPkts18to83Octets |
| DataPkts64to127Octets | DataPkts64to127Cctets |
| DataPkts128to255Octets | DataPkts128to255Octets |
| DataPkts256to511Octets | DataPkts256to511Octets |
| DataPkts512to1023Octets | DataPkts512to1023Octets |
| DataPkts1024to2047Octets | DataPkts1024to2047Octets |
| DataPkts2047to4095Octets | DataPkts2047to4095Octets |
| DataPkts4096to8191Octets | DataPkts4096to8191Octets |
| DataPktsGreaterThan18000Octets | DataPktsGreaterThan18000Octets |

TABLE 4

RMON MIB Support - Alarm

Alarm Group alarmSampleType
alarmValue
alarmStartupAlarm
alarmRisingThreshold
alarmFallingThreshold
alarmRisinEventIndex
alarmFallingEventIndex

TABLE 5

RMON MIB Support - Host

| Host Group | Host TopN Group |
|---|---|
| InPkts | hostTopNInPkts |
| OutPkts | hostTopNOutPkts |
| InOctets | hostTopNInOctets |
| OutOctets | hostTopNOutOctets |
| OutErrors | hostTopNOutErrors |
| OutBroadcastPkts | hostTopNOutBroadcastPkts |
| OutMulticastPkts | hostTopNOutMulticastPkts |

TABLE 6

RMON MIB Support - Matrix

Matrix Group matrixSDPkts
matrixSDOctets
matrixSDErrors

TABLE 7

RMON MIB Support - Filter

Filter Group filterPktData
filterPktDataMask
filterPktDataNotMask
filterPktStatus
filterPktStatusMask
filterPktStatusNotMask Note:
Group not supported on roving interfaces

TABLE 8

RMON MIB Support - Packet Capture

Packet Capture Group bufferControlFullStatus
bufferControlFullAction
bufferControlCaptureSliceSize
bufferControlDownloadSliceSize
bufferControlDownloadOffset
bufferControlMaxOctetsRequested
bufferControlMaxOctetsGranted
bufferControlCapturedPackets
bufferControlTurnOnTime Note:
Group not supported on roving interfaces

TABLE 9

RMON MIB Support - Event

EventGroup eventCommunity
eventLastTimeSent

Note:
Group not supported on roving interfaces

TABLE 10

RMON MIB Support - Station

Station Group ringStationMacAddress
ringStationLastNAUN
ringStationStationStatus[1]
ringStationLastEnterTime[1]
ringStationLastExitTime[1]
ringStationInLineErrors
ringStationOutLineErrors
ringStationInternalErrors
ringStationInBurstErrors
ringStationACErrors
ringStationAbortErrors
ringStationLostFrameErrors
ringStationCongestionErrors
ringStationFrameCopiedErrors
ringStationFrequencyErrors
ringStationTokenErrors
ringStationInBeaconErrors
ringStationOutBeaconErrors
ringStationInsertions[1]

Note:
[1]Entry not supported on roving interfaces

TABLE 11

RMON MIB Support - Station Order

Station Order Group ringStationOrderOrderIndex
ringStationOrderMacAddress

TABLE 12

RMON MIB Support - Configuration

Config Group ringStationConfigControlTable
ringStationConfigTable

TABLE 13

RMON MIB Support - Source Routing

Source Routing Group sourceRoutingStatsInFrames
sourceRoutingStatsOutFrames
sourceRoutingStatsThroughFrames
sourceRoutingStatsAllRoutesBroadcastFrames
sourceRoutingStatsInOctets
sourceRoutingStatsOutOctets
sourceRoutingStatsThroughOctets
sourceRoutingStatsAllRoutesBroadcastOctets
sourceRoutingStatsSingleRoutesBroadcastOctets
sourceRoutingStatsLocalLLCbFrames
sourceRoutingStats1HopFrames
sourceRoutingStats2HopFrames
sourceRoutingStats3HopFrames
sourceRoutingStats4HopFrames
sourceRoutingStats5HopFrames
sourceRoutingStats6HopFrames
sourceRoutingStats7HopFrames
sourceRoutingStats8HopFrames
sourceRoutingStatsMoreThan8HopFrames
sourceRoutingStatsOwner
sourceRoutingStatsStatus

APPENDIX B

| Command | Direction | Type | Comments |
| --- | --- | --- | --- |
| CONFIGURE SECONDARY UFIC | to LAN Switch | Unsolicited | UFIC configuration table to be set by the LAN Switch i960. |
| SET TCP/IP ADDR (may not need this) | to RMON UFC | Command/Response | Set TCP/IP Address |
| START DEDICATED PORT | to LAN Switch | Command/Response | Mux set on LAN Switch to monitor dedicated port. Begin to gather stats. |
| START DEDICATED PORT ACK | to RMON UFC | Command/Response | Acknowledge reception of command |
| START ROVING PORT | to LAN Switch | Command/Response | Mux set on LAN Switch to monitor roving port. Begin to gather stats. |
| START ROVING PORT ACK | to RMON UFC | Command/Response | Acknowledge reception of command |
| START MONITOR BUS | to LAN Switch | Command/Response | UFIC set to monitor LAN Switch internal bus port. Begin to gather stats. |
| START MONITOR PORT ACK | to RMON UFC | Command/Response | Acknowledge reception of command |
| GET PORT INFO | to LAN Switch | Command/Response | Obtain the LAN Switch port configuration tables |
| GET PORT INFO ACK | to RMON UFC | Command/Response | Indicate the LAN Switch port configuration tables have been loaded in the mailbox |

APPENDIX B-continued

| Command | Direction | Type | Comments |
|---|---|---|---|
| PORT STATUS CHANGED | to RMON UFC | Unsolicited | Indicate the LAN Switch port configuration tables have changes are loaded in the mailbox |

What is claimed is:

1. A network interconnecting device including:

a housing;

at least two ports coupled to the housing;

a switching fabric, operative in transporting electrical signals, disposed within the housing;

a processor subsystem operatively coupled to the switch fabric;

a first circuit arrangement operatively coupling the at least two ports and the switching fabric, said circuit arrangement operative to route electrical signals representative of information packets between the at least two ports; and a single probe mounted within the housing and operatively coupled to the switching fabric and the at least two ports wherein said single probe gathers and provides statistical information from the at least two ports.

2. The network interconnecting device of claim 1 wherein gathering and providing statistical information is consistent with RFC 1757.

3. The network interconnecting device of claim 1 further including at least a third port coupled to the housing; and a second circuit arrangement interconnecting the at least third port to the switching fabric wherein the at least third port operates at a data rate higher than the data rate of the at least two ports.

4. The network interconnecting device of claim 1 wherein the switching fabric includes a bus.

5. The network interconnecting device of claim 4 wherein the second circuit arrangement includes circuits that process signals from an Asynchronous Transfer Mode (ATM) network.

6. The network interconnecting device of claim 1 wherein the probe includes a Programmable Logic Device (PLD) operatively coupled to receive signals from the ports and selecting at least one of said signals;

circuit arrangement that processes the selected at least one of said signals in accordance with a predetermined protocol to detect data signals therefrom;

a first storage that stores the data signals; and a controller that analyses the data signals to provide predetermined statistical data indicating operational status at the ports.

7. The network interconnecting device of claim 6 wherein the probe further includes an interface that monitors information on the switching fabric;

a second circuit arrangement for processing monitored information to extract data signals representative of selected ones of the monitored information; and storage, accessible to the controller, for storing the data signal.

8. The network interconnecting device of claim 6 wherein the controller includes a programmed processor.

9. The network interconnecting device of claim 6 wherein the Programmable Logic Device further includes a first MUX;

a second MUX;

electrical conductors connecting the first MUX and the second MUX in parallel configuration relative to each other and in serial configuration with each port; and selection circuit arrangement response to first control signals from the controller to output signals to enable the first MUX and the second MUX to gather signals from selected ports.

10. The network interconnecting device of claim 9 wherein the selection circuit arrangement includes a register.

11. The network interconnecting device of claim 1 wherein the single probe gathers and provides statistical information regarding internal operations of said interconnecting device.

12. A probe for monitoring networks coupled by an interconnecting device including:

a circuit arrangement, mounted inside the interconnecting device, that collects signals on a fixed time basis manner or time-slice manner at ports of said interconnecting device;

a logic circuit arrangement that processes the signals and generating statistical information therefrom; and a processor based system that processes said statistical information and arranging them into RMON data groups as specified by RFC 1757 standard.

13. The probe of claim 12 wherein at least the processor based system, the circuit arrangement and the logic circuit arrangement are packaged as a Universal Feature Card (UFC) for integrally mounting in said interconnecting device.

14. The probe of claim 12 further including a management station executing software programs for accessing the processor based system and displaying selected RMON data groups.

15. A probe for integrating in a network interconnecting device including:

a first interface with circuits that monitor signals from at least one port within a group of ports to collect data on a fixed time basis from said at least one port;

a second interface with circuits that roves the ports in the group and monitors signals to collect data on a time-slice basis; and a controller that processes the data and arranges the processed data in a Management Information Base (MIB).

16. The probe of claim 15 wherein fixed data collection and roving data collection are done simultaneously.

17. The probe set forth in claim 15 wherein the data are gathered and arranged to comply with RFC 1757 Standard.

18. The probe set forth in claim 15 further including a third interface that monitors internal operations of the network interconnect device to gather internal statistics.

19. A method to gather statistical information from a network interconnecting device including the steps of:

using circuits in a first interface of a probe to collect the statistical information on a fixed time basis from at least one port in a group of ports;

using circuits in a second interface of said probe to rove the ports in said group of ports and collect the statistical information on a time slice basis; and using a controller to process the statistical information and arranging in a Management Information Base.

20. The method of claim 19 further including the steps of collecting fixed data and roving data simultaneously.

* * * * *